(No Model.) 2 Sheets—Sheet 1.

H. BRISCOE.
HAY LOADER.

No. 467,366. Patented Jan. 19, 1892.

WITNESSES
Fred G. Dieterich
P. B. Turpin

INVENTOR:
Henry Briscoe
BY Munn & Co
ATTORNEYS (No Model.) 2 Sheets—Sheet 2.
H. BRISCOE.
HAY LOADER.
No. 467,366. Patented Jan. 19, 1892.
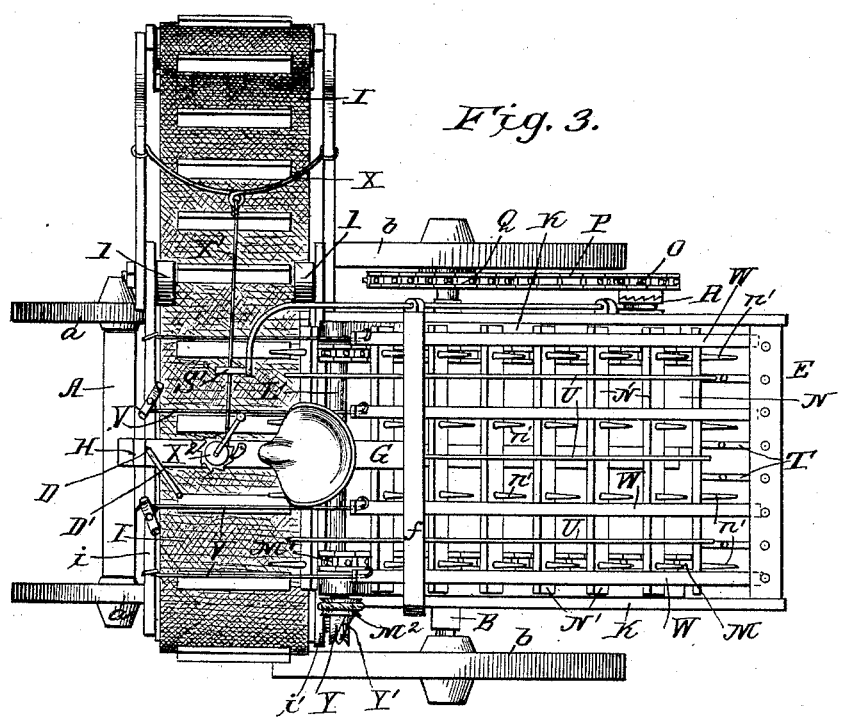
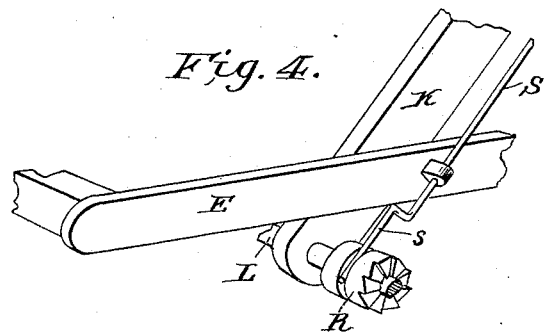
WITNESSES:
Fred G. Dieterich
P. B. Turpin
INVENTOR:
Henry Briscoe
BY
ATTORNEYS

UNITED STATES PATENT OFFICE.

HENRY BRISCOE, OF MORRISONVILLE, ILLINOIS, ASSIGNOR OF ONE-HALF TO ARNEST E. GOWIN, OF SAME PLACE.

HAY-LOADER.

SPECIFICATION forming part of Letters Patent No. 467,366, dated January 19, 1892.

Application filed November 7, 1890. Serial No. 370,712. (No model.)

*To all whom it may concern:*

Be it known that I, HENRY BRISCOE, of Morrisonville, in the county of Christian and State of Illinois, have invented a new and useful Improvement in Haying-Machines, of which the following is a specification.

My invention is an improved hay-loader or haying-machine; and the invention consists in certain novel constructions and combinations of parts, as will be hereinafter described and claimed.

Figure 1:
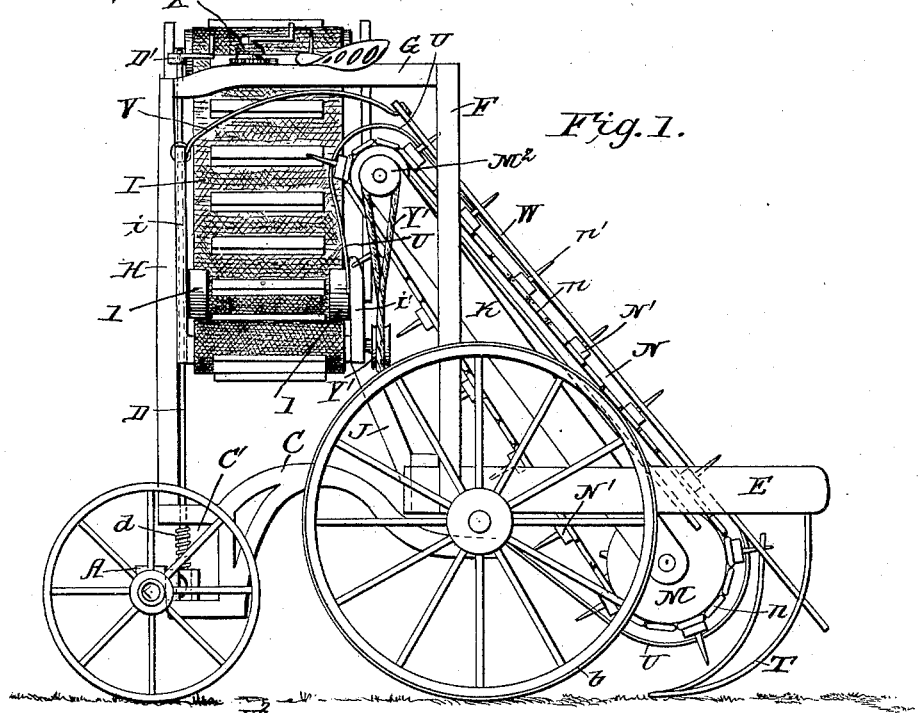
Figure 2:
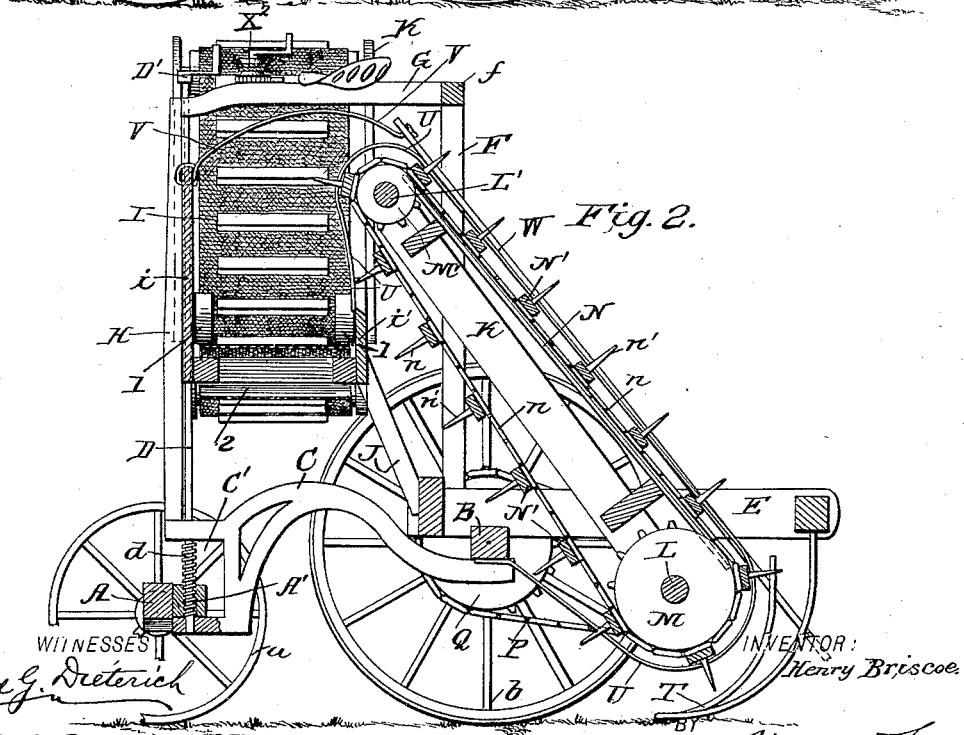

In the drawings, Figure 1 is a side view. Fig. 2 is a sectional view. Fig. 3 is a top plan view of my machine, and Fig. 4 is a detail view.

The machine is shown as formed with a carriage comprising the front axle A and its wheels $a$, the rear axle B and its wheels $b$, and the perch-pole or connection C, made fast at its rear end to the rear axle and having at its front end a vertically-elongated opening or recess C', in which the front axle is held and can be adjusted vertically. Such front axle is provided centrally with a threaded opening A', in which the threads $d$ of shaft D operate. This shaft D journals in the perch-pole and extends up in convenient reach of the driver's seat, being provided at its upper end with a crank D' or the like, so the shaft can be easily turned. By turning this shaft it will be seen the front end of the perch-pole will be set higher or lower, and the rake-teeth supported in rear of the rear axle will by such adjustment be raised or lowered, as may be desired.

A frame E, which may be termed the "rake-frame," is secured near its front end to the rear axle and extends rearwardly therefrom. Uprights F are mounted at the front end of the frame E at the opposite sides thereof, and project for a considerable height, as shown. The upper ends of these uprights are connected by cross-bar $f$, from the center of which the seat-bar G projects forward, and is fixed at its forward end to the front upright H mounted upon the front end of the perch-pole. The transverse carrier-trough I has its front side board $i$ secured to the front upright H and its rear side board $i'$ supported upon uprights J, which are mounted upon the front end of the rake-frame E. The elevator has its frame K fixed near its lower end to the rake-frame E and near its upper end to the uprights F, being fixed in an inclined position, with its upper forward end above the rear side $i'$ of the transverse carrier-trough I. A drive-shaft L is journaled in the lower end of the frame K and is provided with sprockets M for the elevator-apron N and with a sprocket-wheel or a pulley O for the drive-belt P, which is placed on and driven by the pulley Q on one of the wheels $b$. The pulley O is loose on the shaft L and may be keyed thereto by the sliding clutch R, arranged to be operated by the crank $s$ on the shaft S, which shaft has a handle S' arranged adjacent to the driver's seat, so that the elevator may be readily thrown into or out of operation. The upper shaft L' has sprocket-wheels M' and is provided with an end pulley M² for the purpose presently described. The apron N fits over the shafts L L' and is provided with the sprocket-belts $n$, fitting the wheels L L', and with cross-slats N', having teeth $n'$. The rake-teeth T are supported at the rear end of the rake-frame and curve down below the lower end of the elevator, and as the machine moves forward the rake-teeth rake up the hay, and it is caught by the elevator and carried up and delivered into the trough I. Rods U are secured at their upper ends to the back board $i'$ of the trough I and are curved up over the upper end of the elevator-apron, and thence down close to the upper side thereof and around below the lower end of the said apron, and are secured at their lower ends to the rear axle. These rods serve to strip the hay from the elevator at its upper end and deliver it into the trough I, and they also operate to prevent hay from getting into the lower end of the elevator and winding upon the shaft L and otherwise clogging the machine.

Rods V are secured at one end to the front side board $i$ of the trough I, are arched thence above the trough, and are connected with the upper ends of bars or strips W, the lower ends of which are free. These strips W extend down the full length of the upper side of the elevator and serve by their weight to press the hay down on the apron and prevent it from being blown away or jarred off by the motion of the machine.

The transverse carrier by which the hay is discharged into a wagon moving alongside is composed of the fixed section supported on the uprights H and J and the outer section, which is hinged at its inner end to the fixed section and may be adjusted vertically at its outer end, such adjustment being effected by means of a bail X and rope X', connecting the same with the windlass X², by turning which the outer end of the transverse carrier may be raised or lowered, as desired. The apron for this transverse carrier is driven by its lower roller Y, geared by belt Y' with the pulley M². This apron is guided as it passes the angle between the fixed and adjustable sections of its frame by means of guide rollers or pulleys 1 and the roller 2, as clearly shown in the drawings. The operation of the machine will be readily understood from the foregoing description.

Having thus described my invention, what I claim as new is—

1. In a hay-loader, substantially as described, the combination of the rear axle, the perch-pole secured at its rear end to said axle and provided at its front end with a vertically-elongated opening or recess, the front axle fitted in the said recess and provided with a threaded opening, and the adjusting-shaft journaled in the perch-pole and provided with threads fitting the threaded opening in the front axle, whereby the turning of the shaft may adjust the front end of the perch with respect to the axle, the rake, and the elevator, all substantially as and for the purposes set forth.

2. The combination of the carriage and framing, the elevator, the transverse carrier having its trough arranged below the discharge end of the elevator, the rods secured to the rear side board of such trough and extended thence up over and down close to the upper side of the elevator, and the rods V, secured at one end to the front side boards of the trough, arched over the trough, and provided with strips or portions W, extending downward and adapted to press down upon the elevator, all substantially as and for the purposes set forth.

3. In a hay-loader, the combination, with the elevator and the transverse carrier having its trough arranged below the discharge end of the elevator, of rods secured to the front side board of the said carrier, arched thence over the trough, and provided with presser strips or portions resting down upon the upper side of the elevator, all substantially as and for the purposes set forth.

HENRY BRISCOE.

Witnesses:
RUSSELL PRICE,
JAMES P. KING.